United States Patent [19]

Lyons

[11] Patent Number: 5,067,278
[45] Date of Patent: Nov. 26, 1991

[54] ACCESS DOOR FOR AIR FLOW CONDUITS

[75] Inventor: John Lyons, Leviton, N.Y.

[73] Assignee: Duro Dyne Corporation, Farmingdale, N.Y.

[21] Appl. No.: 623,366

[22] Filed: Dec. 7, 1990

[51] Int. Cl.$^5$ .............................................. E06B 3/32
[52] U.S. Cl. ..................................... 49/463; 292/241
[58] Field of Search ................ 49/463, 466, 394, 397; 292/240, 241

[56] References Cited

U.S. PATENT DOCUMENTS

| 11,227 | 7/1854 | Ingalls | 49/463 |
|---|---|---|---|
| 1,320,175 | 10/1919 | Reid | 292/240 |
| 1,849,907 | 3/1932 | Clay | 49/261 |
| 1,876,115 | 9/1932 | Way | 292/241 X |
| 3,306,644 | 2/1967 | Larsen | 292/241 |
| 3,789,550 | 2/1974 | Seiwert | 49/394 X |
| 3,792,551 | 2/1974 | Hallas | 49/463 |
| 4,067,605 | 1/1978 | Green et al. | 49/394 X |
| 4,102,546 | 7/1978 | Costello | 292/241 X |
| 4,130,966 | 12/1978 | Kujawa et al. | 49/463 X |
| 4,730,413 | 3/1988 | Henry | 49/463 X |
| 4,813,726 | 3/1989 | Ravinet | 292/241 |
| 4,890,418 | 1/1990 | Sachs | 49/463 |

FOREIGN PATENT DOCUMENTS

| 750701 | 1/1967 | Canada | 49/463 |
|---|---|---|---|
| 864523 | 1/1953 | Fed. Rep. of Germany | 292/241 |
| 380160 | 9/1932 | United Kingdom | 49/463 |

Primary Examiner—Rodney M. Lindsey
Assistant Examiner—Jerry Redman
Attorney, Agent, or Firm—Mark T. Basseches; Paula T. Basseches

[57] ABSTRACT

A readily demountable door assembly for sealing an aperture in a duct comprises a door member having an inwardly directed ramp or cam which lies within the duct and is inclined outwardly toward the duct surface. A clamp is adapted to be mounted adjacent the aperture of the duct at a position diametrically opposite the ramp. The clamp engages the door and shifts the same in the direction of the ramp, which movement presses the flange of the door tightly against the duct surface, the clamp including portions which overlie the door at positions remote from the ramp to urge such remotely disposed portions of the door against the duct surface.

3 Claims, 1 Drawing Sheet

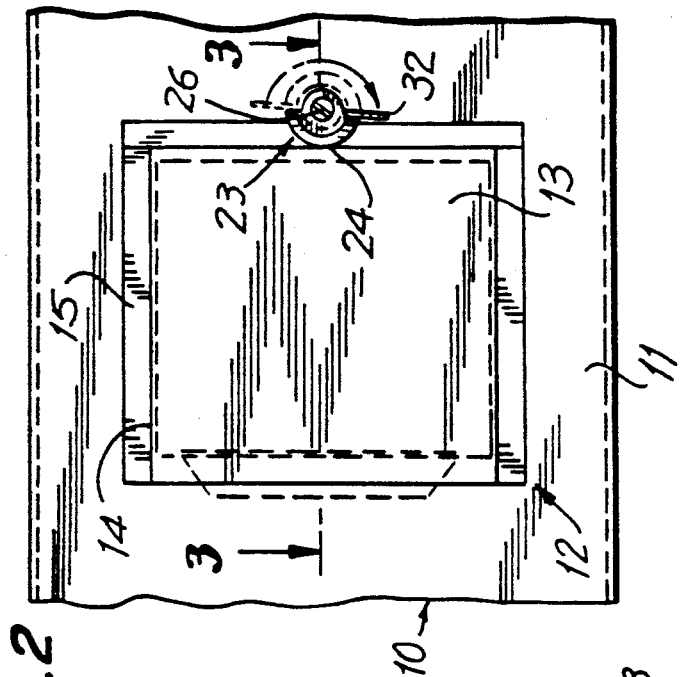
FIG. 2
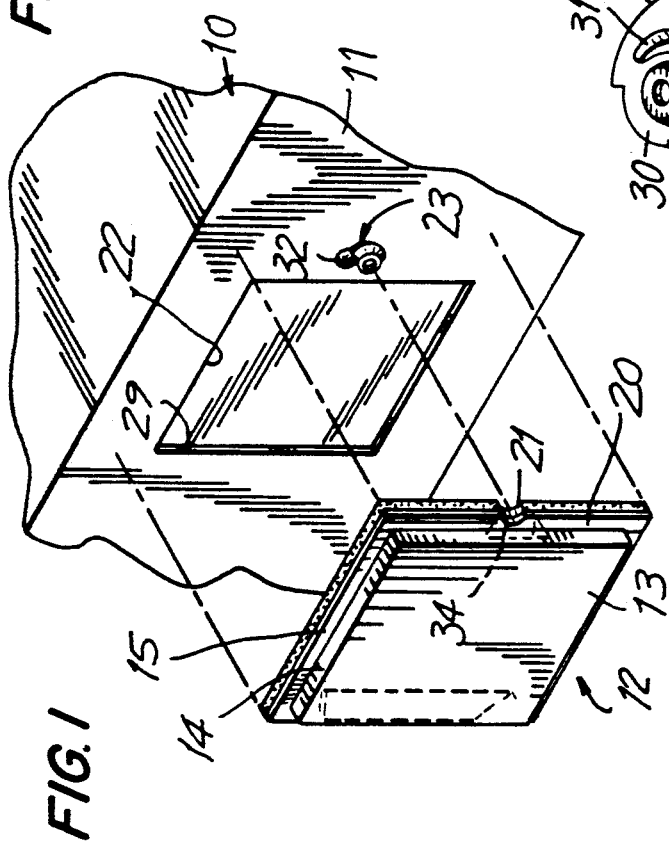
FIG. 1
FIG. 4
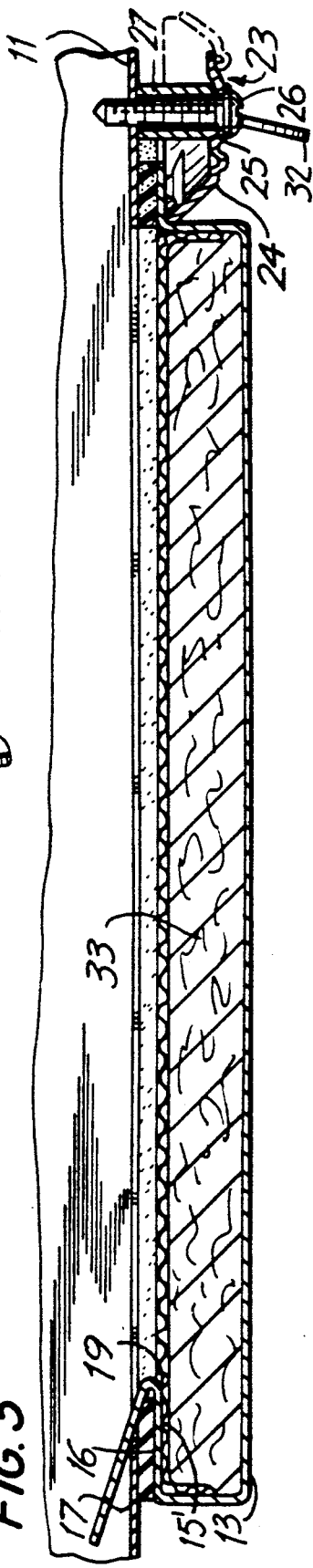
FIG. 3

ACCESS DOOR FOR AIR FLOW CONDUITS

BACKGROUND OF THE INVENTION

1. Field of the Invention

The present invention is in the field of access doors intended to be used on air conditioning (heating and cooling) ducting to permit elements within the ducting system, such as air turning vanes and the like to be accessed from time to time.

2. The Prior Art

In air conduit systems such as are used for heating and cooling it is often necessary to provide means for obtaining access to components disposed within the ducting. One conventional mode of providing such access involves supplying a frame to which a door is hinged. The door and frame, comprising a unitary assembly, may include gasketting material for preventing leaks at the duct interface and a latch whereby the door may be released from the closed condition to an open condition.

Composite assemblies of the type described are mounted by cutting an appropriately sized hole in the duct and by affixing flanges formed on the frame component to exterior surfaces of the duct, as by a multiplicity of sheet metal screws or the like.

Assemblies of the type described are relatively expensive and time consuming to install.

Other forms of access door mechanisms for ducts, etc. are illustrated in one or more of the following U.S. Pat. Nos: 1,849,907; 3,537,212; 4,206,784; 3,566,566; 4,890,418.

The assemblies of each of the door devices described are relatively complex and necessitate substantial metal work to effect installation.

SUMMARY OF THE INVENTION

The present invention may be summarized as directed to an access door device for air ducting which is inexpensive to fabricate and easy to install, requiring no ancillary frame, hinging arrangements or permanent affixation components such as sheet metal screws, rivets or the like.

More particularly, the invention is directed to an access door which may be mounted by merely cutting an appropriately sized hole in the duct, with no permanent connection between the door and duct, enabling the door to be bodily removed.

In accordance with the invention, the door comprises a pan-like element having a laterally projecting flange extending beyond the perimeter of the pan, the inner faces of the flange carrying a gasket adapted to be compressed against the outer surface of the duct.

One of the flange surfaces includes an extension comprising an inclined ramp projecting angularly inwardly away from the plane of the flange and defining an acute angle with the flange from which it extends.

A clamp member is provided for affixation to the duct at a position remote from and opposite the ramp, the clamp including a first arcuate cam face proximate to and directed toward a raised portion of the pan projecting outwardly from the duct surface.

The cam surface of the clamp includes portions which progressively approach the ramp component of the pan as the clamp is rotated. The clamp preferably includes a secondary cam component inclined angularly toward the duct.

The door is mounted by merely inserting the ramp portion of the pan into the interior of the duct through an aperture cut therein. After the flange of the pan is brought into contact with the exterior of the duct, the clamp is rotated to a position above a flange of the pan. During rotary movement of the clamp, the first mentioned cam component engages against an outwardly projecting portion of the pan, forcing the pan bodily in the plane of the duct surface to seat an edge of the duct in the acute angle defined between the ramp and flange.

The secondary cam of the clamp, in the course of such turning movement, forces the clamp-adjacent flange of the door tightly against the duct surface, whereby the pan is intimately engaged against the duct, compressing the gasket and forming a leak resistant seal with the duct.

It is accordingly an object of the invention to provide an inexpensive access door readily mountable to a duct.

A further object of the invention is the provision of a door of the type described wherein the sole element which need be permanently affixed to the duct is the rotatable clamp, such affixation being effected by threading a single fastener element through an aperture of the clamp and into the duct.

Still a further object of the invention is the provision of an access door of the type described which does not require a separate frame suporting the door.

To attain these objects and such other objects as may appear herein or be hereinafter pointed out reference is made to the accompanying drawings forming a part hereof wherein:

BRIEF DESCRIPTION OF DRAWINGS

FIG. 1 is an isometric view of a duct and access door assembly in accordance with the invention, with the door in a preinstalled, spaced relation to the duct;

FIG. 2 is a front elevational view of the door mounted to the duct in closed position;

FIG. 3 is an enlarged section taken on the line 3—3 of FIG. 2;

FIG. 4 is a bottom plan view of the clamp member.

DETAILED DESCRIPTION OF THE DRAWINGS

In FIG. 1 there is shown an air duct 10 having a planar face 11 to which an access door is to be mounted. The access door 12, in the illustrated embodiment, is in the configuration of a rectangular pan, including an outer face 13 and a raised perimeter 14 extending inwardly from the outer face 13.

A flange member 15 extends outwardly from the perimeter 14, the inner face 16 of the flange preferably having a resilient gasket 17 bonded thereto.

The flange segment 15' includes an angularly outwardly inclined cam or ramp 18 extending from the innermost edge 19 of the flange section 15', the junction of the portions 15' and 18 defining therebetween an acute angle.

The flange section 20 opposite flange portion 15' preferably includes an arcuate cutout 21 to provide clearance for a portion of the clamp, as more fully set forth hereafter.

As will be apparent from FIGS. 2 and 3, the access door may be mounted within rectangular aperture 22 formed in the duct surface 11, the aperture 22 being slightly smaller than the dimensions of the flange 15 whereby the gasket 17, in the mounted condition of the door, will engage against surfaces of the duct component 11 surrounding aperture 22.

A clamp assembly 23 is provided for mounting on duct surface 11 adjacent aperture 22. The clamp 23 includes a domed portion 24 having a central aperture 25. The clamp is mounted to duct surface 11 as by a sheet metal screw 26 extending through bushing 27.

The clamp member 23 includes a first arcuate cam face 28 which will, upon rotation of the clamp member in a clockwise direction, progressively approach the edge portion 29 of the aperture 22 in the duct. Optionally but preferably, the under surface 30 of the clamp includes a second cam surface 31 directed toward the duct surface 11.

The door is installed in aperture 22 by holding the door at an angle relative to the aperture and sleeving the ramp 18 under the wall 29 of the aperture. Thereafter the door is pivoted so that the gasket is in coplanar alignment with the surface 11 of the duct. Portions of the clamp may pass through the cutout 21 in flange 20 of the door. When the flange 20 is closer to the surface 11 of the duct than the under surface 30 of the clamp, the clamp is rotated clockwise as viewed in FIGS. 1 to 3, utilizing the projecting lever 32.

With continued rotation cam surface 28 will shift the access door bodily (to the left as viewed in FIGS. 1 to 3), wedging the edge 29 of the duct tightly into the space between flange portion 15' and ramp 18. Such rotation will simultaneously cause the cam surface 31 of the clamp to urge flange portion 20 tightly against duct surface 11, whereby the door is simultaneously urged bodily toward the duct surface 11 at one end by the inclined ramp 18 and at the other end by the cam surface 31. Optionally an insulating pad 33 may be bonded to the inner face of the pan.

As will be apparent from the preceding description access to the interior of the duct is obtained by an anticlockwise rotation of the clamp whereby the cam portion 28 is removed from overlying position of the flange 20, at which position the door may be pivoted outwardly and removed.

As an alternative to the cam surface 31, the flange 20 adjacent cutout 21 may include an inclined face 34 (FIG. 1 dash lines) for providing the forces for urging the flange 20 toward duct surface 11.

As will be apparent to those skilled in the art and familiarized with the instant disclosure, there is described an inexpensive and easily installed access door for air flow conduits. Numerous variations in details of construction may occur to those skilled in the art in the light of the disclosure and, accordingly, the invention is to be broadly construed within the scope of the appended claims.

Having thus described the invention and illustrated its use, what is claimed as new and is desired to be secured by Letters Patent is:

1. An access door assembly for an air flow duct comprising a door including a generally planar back portion, a perimeter member projecting from the margins of said back portion, a continuous surrounding flange extending from said perimeter member, the surfaces of said flange being disposed in co-planar alignment, gasket means fixed to said surfaces of said flange for forming a continuous seal against a duct surface, a ramp member forming an extension of said flange, said ramp member extending in a direction angularly away from said back portion and projecting outward beyond said perimeter member, said ramp member defining an acute angle with said flange, clamp means adapted to be pivotally mounted to said duct at a position overlying said flange and diametrically opposite said ramp, said clamp means including first arcuate cam surface means positioned to engage said perimeter member for urging said door member laterally away from said clamp means, and second cam surface means for engaging said flange and urging said door tightly against said duct responsive to pivotal movement of said clamp means.

2. An air conduit assembly comprising a duct, an aperture formed in a surface of said duct, a door assembly removably mounted in sealing relation of said aperture and comprising a door member having a flange in alignment with said surface of said duct, gasket means on said flange compressed between said flange and said duct surface for sealing said aperture, a ramp member extending angularly outwardly from and forming a juction defining an acute angle with said flange, said ramp member being disposed within said duct, a clamp member pivotally mounted on said duct at a position diametrically opposite said ramp member, said clamp member including an arcuate cam surface means engaging a portion of said door directed outwardly away from said surface of said duct for shifting said door laterally away from said clamp member and a second cam surface means inclined toward said surface of said duct and bearing against said flange to seat said flange against said duct.

3. An air conduit assembly including a duct having an aperture formed in a surface thereof, a door mounted in sealing relation of said aperture and including a flange, a gasket compressed between said flange and said surface for sealing said aperture, a ramp formed on said door and disposed within said duct, said ramp being inclined toward said surface, and clamp means pivotally mounted on said duct in spaced relation to said ramp, said clamp means having a first cam surface means for shifting said door laterally in the direction of said ramp, second cam surface means for shifting said door toward said duct responsive to pivotal movement of said clamp means, thereby to engage said ramp against an inner surface of said duct and urge said door bodily toward said surface of said duct.

* * * * *